United States Patent Office 3,532,875
Patented Oct. 6, 1970

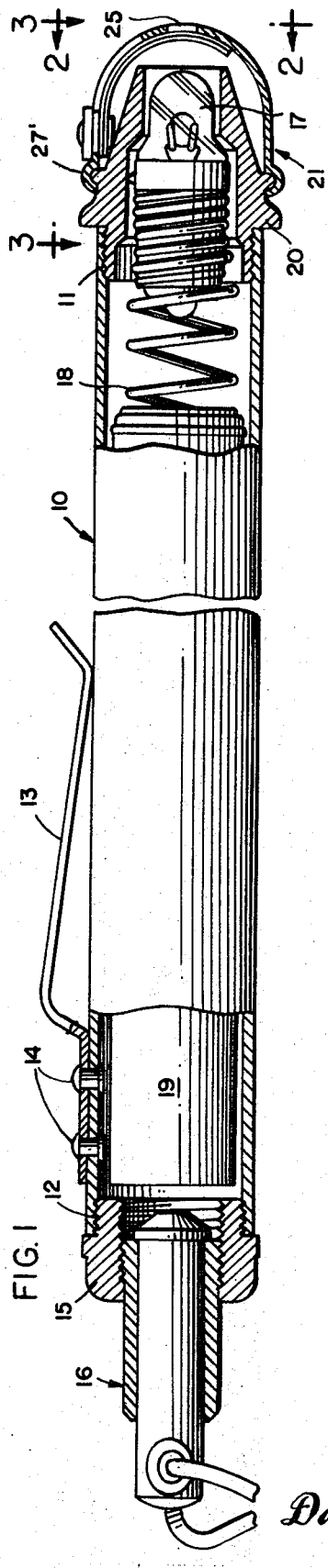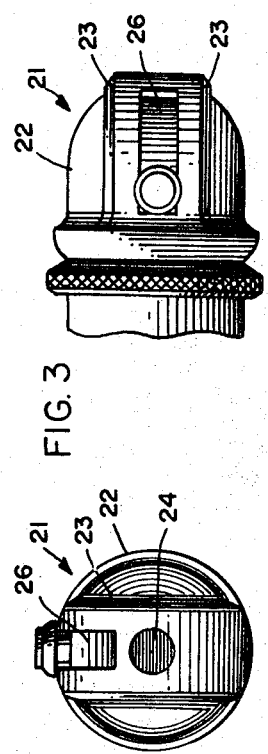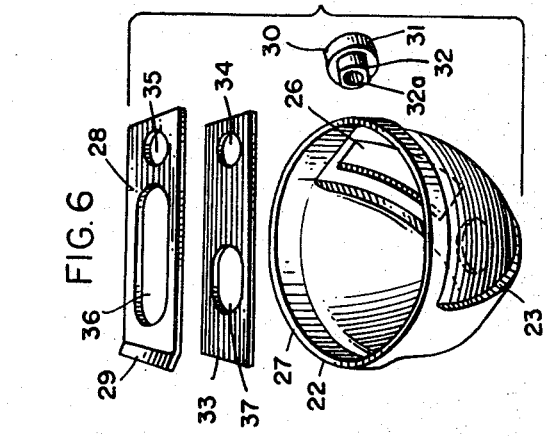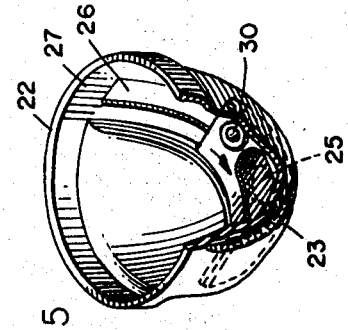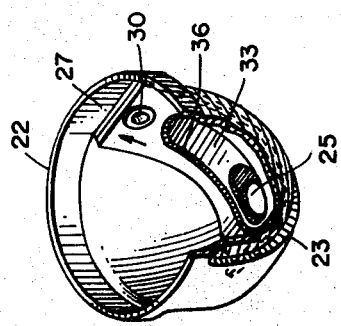

3,532,875
PENLIGHT CLOSURE
Nicholas W. Keller, Chicago, Ill., assignor to Justrite Manufacturing Company
Filed Mar. 26, 1968, Ser. No. 716,046
Int. Cl. F21l 7/00
U. S.Cl. 240—10.66    3 Claims

ABSTRACT OF THE DISCLOSURE

A pocket penlight or flashlight equipped to selectively provide either non-colored or colored light. This is accomplished using a filter element at the light emanating end of the penlight. The light emanating end of the flashlight comprises a cup-shaped closure having a light passing aperture therein. The cup-shaped closure has an internal guide or recess therein shaped to receive and hold a filter assembly. A groove in the internally recessed guide portion enables a button to pass therethrough for attachment to the filter assembly for positioning it to either pass colored or white light. The filter assembly comprises a colored filter plus a spring element for assuring that the filter is properly held within the internal guide recess.

BACKGROUND OF INVENTION

The invention finds particular utility in pocket penlights. Conventionally, these are slim, relatively elongated units equipped with a pocket clip. Thus, they are readily accessible for illuminating small areas. For certain applications, it is desirable to be able to filter the light emanating from the unit—advantageously with a red filter. Because of the limitations of size (and cost), such has not been readily attainable in the past. It would be desirable to provide a simple yet reliable means for filtering the light.

SUMMARY OF INVENTION

The objective mentioned above is achieved through the use of providing a unique cap or closure member. The closure member is generally cup-shaped so as to enclose the bulb-equipped end of the light unit. Guide means are provided within the cup-shaped unit which receive and maintain in "ON" and "OFF" positions a filter element, operable easily from just outside of the cup-shaped member.

DETAILED DESCRIPTION

The invention is explained in conjunction with the accompanying drawing, in which—

FIG. 1 is a fragmentary side elevational view of a pocket penlight, the major portion of which is seen in longitudinal section;

FIG. 2 is an end elevational view of the end closure such as would be seen along the sight line 2—2 applied to FIG. 1;

FIG. 3 is a side elevation view of the end closure of FIG. 1 such as would be seen along the sight line 3—3 applied to FIG. 1;

FIG. 4 is a perspective view of the end enclosure with the filter thereof positioned so as to pass normal light;

FIG. 5 is a view similar to that of FIG. 4 but with the filter positioned over the light passing aperture; and FIG. 6 is an exploded perspective view of the various components of the end closure.

In the illustration given and with reference to FIG. 1, the numeral 10 designates generally an elongated barrel or battery case which is equipped with internally threaded end portions as at 11 and 12. For convenience in carrying the completed unit, the case is equipped with a pocket clip 13 suitably secured by clip rivets 14.

At one end, the barrel 10 is equipped with a cap 15 threadably received therein. Provided as part of the cap 15 is a switch generally designated 16 which serves to complete the circuit between a bulb 17, battery spring 18, and a battery 19. The bulb is mounted within a bulb housing 20 threadably received within the barrel 10. This much of the structure is generally conventional and the invention here is concerned primarily with the filter cap or closure generally designated 21.

The basic part of the closure 21 is a generally cup-shaped housing 22 which can be seen in end and side elevational views in FIGS. 2 and 3, respectively. The member 22 has integrally formed therein a relatively elongated, outwardly projecting groove 23 which passes through the central bottom 24 of the member. The central bottom of the member 22 is apertured as at 25, in axial alignment with the generally cylindrical barrel 10 so as to pass light from the bulb 17. Spaced laterally from the aperture 25 and within the groove 23 is provided a relatively elongated slot 26. Additionally, the member 22 has a circular lip portion as at 27 (see FIG. 3) which is crimped as at 27' (see FIG. 1) for mounting on the housing 20.

The remainder of the closure 21 can be best appreciated from a consideration of FIG. 6. Positioned within the groove 23 is a resilient spring element 28. Prior to installation, the spring element 28 is essentially planar except that one end is bent as at 29. For example, the element 28 may be constructed of 0.0005" thick clock-spring material so as to resiliently conform to the shape of the groove 23. Maintaining the element 28 within the groove is a button 30 which has an elongated end portion 31 provided exteriorly of the cup-shaped member 22. Extending through the slot 26 is the flattened shank portion 32 of the button 30 and a rivet 32a extending through the shank portion 32 is expanded at its inner end after installation to maintain the element 28 in position. The element 28 has associated therewith a filter 33 and both the filter 33 and an element 28 are apertured as at 34 and 35, respectively, for the receipt of the shank portion 32 of the button 30. In the illustration given, the filter is advantageously constructed of 0.015" thick red cellulose acetate.

Because the element 28 is essentially an open frame, i.e., having an elongated central aperture as at 36, and because the filter 33 has an aperture 37, it is possible to position the element 28 in "OFF" and "ON" positions. In FIG. 4, for example, the button 30 is moved to one end of the slot 26 so as to align the aperture of opening 37 of the filter 33 in alignment with the light passing aperture 25. In FIG. 5, the button 30 has been moved to its other extreme, i.e., adjacent the central bottom of the member 22 so as to position the main body of the filter 33 in register with the aperture 25.

From the foregoing, it wil be seen that the groove 23 constitutes a guide means for the filter-equipped element 28. Further, the button 30, in addition to providing a means for positioning the filter-equipped element 28, additionally serves to confine the filter-equipped element 28 within the guide means.

While in the foregoing specification a detailed description of an embodiment of the invention has been set down for the purpose of illustration, many variations of the details herein given may be made by those skilled in the art without departing from the spirit and scope of the invention.

I claim:

1. In a pocket penlight or the like having an elongated battery-equipped barrel closed at one end and having a bulb at the other end, the improved closure for the bulb end comprising:

a generally cup-shaped member having relatively elongated guide means provided interiorly thereof and passing through the central bottom of said member,
said member also having a light-passing aperture within said guide means at said central bottom and an elongated slot within said guide means spaced from and generally aligned with said aperture,
a filter equipped element positionably mounted in said guide means,
said filter equipped element being constructed and arranged to pass filtered light in one position and unfiltered light in another position,
button means on said element projecting through said slot for positioning said element,
said element including a resilient open frame generally shaped to conform to said gunde means and being equipped in one open portion with a filter,
said guide means including an outwardly projecting groove formed integrally in said member,
said button means having an enlarged portion outwardly of said member to confine said frame within said groove.

2. The structure of claim 1 wherein said filter equipped element comprises a colored filter,
said colored filter being normally planar shaped but held contiguous to said cup shaped member by said resilient open frame,
said colored filter having an aperture therein which is positioned in registry with said light passing aperture when said button is at one end of said slot, and said aperture being moved from registry with said light passing aperture when said button is moved toward the other end of said slot whereby said colored filter covers said light passing aperture to provide colored light.

3. The structure of claim 2, wherein said open frame is normally planar shaped but conforms to the shape of the guide means when positioned and held therein by said button, and
wherein one end of said resilient frame is bent to be spaced away from said cup shaped member when said frame is positioned in said guide means.

References Cited
UNITED STATES PATENTS

| | | | |
|---|---|---|---|
| 2,313,356 | 3/1943 | New | 240—10.6 XR |
| 2,385,640 | 9/1945 | Packer et al. | 240—10.66 |
| 2,389,591 | 11/1945 | Brown | 240—10.6 |
| 2,751,490 | 6/1956 | Emerson | 240—10.6 |

NORTON ANSHER, Primary Examiner

R. L. MOSES, Assistant Examiner

U.S. Cl. X.R.

240—10.68, 46.03, 46.59